United States Patent
Zhou et al.

(10) Patent No.: US 9,461,915 B1
(45) Date of Patent: Oct. 4, 2016

(54) SYSTEM AND METHOD FOR REDUCING CONSUMPTION OF HARDWARE RESOURCES USING WEIGHTED COST MULTI-PATH FLOW DISTRIBUTION

(75) Inventors: Junlan Zhou, Sunnyvale, CA (US); Amin Vahdat, Los Altos, CA (US); Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 13/358,966

(22) Filed: Jan. 26, 2012

(51) Int. Cl.
  *H04L 12/891* (2013.01)
  *H04L 12/801* (2013.01)
  *H04L 12/803* (2013.01)

(52) U.S. Cl.
  CPC ............ *H04L 47/10* (2013.01); *H04L 47/125* (2013.01)

(58) Field of Classification Search
  None
  See application file for complete search history.

(56) References Cited

U.S. PATENT DOCUMENTS

| | | | | |
|---|---|---|---|---|
| 7,062,559 B2 * | 6/2006 | Yoshimura | .......... | H04L 12/4645 709/224 |
| 2004/0017804 A1 * | 1/2004 | Vishnu | .......... | 370/386 |
| 2013/0039182 A1 * | 2/2013 | Das | .......... | H04L 41/0816 370/235 |

OTHER PUBLICATIONS

U.S. Appl. No. 13/358,835.

\* cited by examiner

*Primary Examiner* — Rhonda Murphy
(74) *Attorney, Agent, or Firm* — McDermott Will & Emery

(57) ABSTRACT

The present technology considers network devices that include forwarding tables having a number of next-hop entries (e.g., egress ports) where it is possible that the egress port utilization can be load balanced using WCMP groups. To implement a WCMP group, its members are assigned weights representing an amount of data flow to distribute over a plurality of links for a given destination. The members may be replicated in a forwarding table proportionally to their assigned weights. This disclosure provides systems and methods to reduce the number of forwarding table entries required when implementing a WCMP group.

21 Claims, 5 Drawing Sheets

400

430

SYSTEM AND METHOD FOR REDUCING CONSUMPTION OF HARDWARE RESOURCES USING WEIGHTED COST MULTI-PATH FLOW DISTRIBUTION

BACKGROUND

Given the topology of a network, routing determines a path data packets may take from their source to a destination. In this regard, network switches can often provide multiple paths with potentially different maximum bandwidths. For example, a datacenter switch may include a plurality of egress ports used to uplink data entering the switch to its next hop destination. The egress ports can be connected to physical network links, which are capable of handling a number of bits per second (i.e. Kbps, Mbps and Gbps). Typically, alternate paths taken by data packets originating from different nodes in the network can create packet collisions. This may be caused by multiple data packets requesting the same destination. These collisions can create congestion in the network resulting in higher latency and lower throughput.

SUMMARY

Routing techniques such as Weighted Cost Multi-Path (WCMP) may be employed to avoid network collisions by load balancing data over a plurality of network uplinks. To implement a WCMP group, its members may be replicated in a forwarding table proportionally to their assigned weights. One aspect of the present technology provides a method for reducing a number of entries in a forwarding table of a first-stage distribution device. The device may include a plurality of ports linked to a plurality of second stage devices. One or more weighted cost multipath (WCMP) groups may be identified by the method. Each WCMP group may comprise weights assigned to the plurality of ports of the first-stage device for a distribution of data to the plurality of second-stage devices. The method may also comprise determining, using a processor, a percentage of data-throughput corresponding to the assigned weights and determining a threshold value for throughput degradation of the first-stage distribution device. Accordingly, each WCMP group may be reduced by iteratively scaling, using the processor, the weight assigned to a selected port and the weights assigned to non-selected ports in relative proportion to the selected port. Scaling of a WCMP group may continue until the occurrence of a predetermined event. In one aspect, scaling of a WCMP group may further comprise decrementing the weights assigned to the non-selected ports using the following equation $W_i(G')-=floor([W_0(G)-W_0(G')]*W_i(G)/W_0(G))$.

Another aspect of the present technology provides a method for scaling WCMP groups, comprising providing a WCMP group. The WCMP group may comprise weights assigned to a plurality of ports of a first-stage device. A threshold value for throughput degradation of the first-stage distribution device may be provided. Accordingly, each WCMP group may be scaled by iteratively scaling, using a processor, the weight assigned to a selected port and the weights assigned to non-selected ports in relative proportion to the selected port. Scaling of a WCMP group may continue while the threshold value for throughput degradation has not been reached.

Yet another aspect of the present technology provides a system for reducing a number of entries in a forwarding table of a first-stage distribution device. The device may include a plurality of ports linked to a plurality of second stage devices. The system may include a processor and a memory accessible by the processor. In the system, the memory may store instructions executable by the processor. The instructions may identify one or more weighted cost multipath (WCMP) groups. In each WCMP group weights may be assigned to the plurality of ports of the first-stage device for a distribution of data to the plurality of second-stage devices. The system may further include instructions to determine, using a processor, a percentage of data throughput corresponding to the assigned weights and determine a threshold value for throughput degradation of the first-stage distribution device. Accordingly, each WCMP group may be reduced by iteratively scaling, using the processor, the weight assigned to a selected port and the weights assigned to non-selected ports in relative proportion to the selected port. Scaling of the WCMP group may continue until the occurrence of a predetermined event. In one aspect, scaling of a WCMP group may further comprise decrementing the weights assigned to the non-selected ports using the following equation $W_i(G')-=floor([W_0(G)-W_0(G')]*W_i(G)/W_0(G))$.

Yet another aspect of the present technology provides a system for scaling WCMP groups of a first-stage distribution device. The system may include a processor and a memory accessible by the processor. In the system, the memory may store instructions executable by the processor. The instructions may provide a WCMP group. In a WCMP group weights may be assigned to a plurality of ports of a first-stage device. The system may also include instruction to provide a threshold value for throughput degradation of the first-stage distribution device. Accordingly, the WCMP group may be scaled by iteratively scaling, using a processor, the weight assigned to a selected port and the weights assigned to non-selected ports in relative proportion to the selected port. Scaling of the WCMP group may continue while the threshold value for throughput degradation has not been reached.

DETAILED DESCRIPTION

Aspects, features and advantages of this disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

The present technology considers network devices that include forwarding tables having a number of next-hop entries (e.g., egress ports) where it is possible that the egress port utilization can be load balanced using WCMP groups. WCMP group members are assigned weights representing an amount of data flow to distribute over a plurality of links for a given destination.

In this disclosure, systems and methods are provided to reduce the number of forwarding table entries used in implementing WCMP groups. To implement a WCMP group, its members may be replicated in a forwarding table proportionally to their assigned weights. For example, in a network device that has 8 egress ports, a WCMP group configuration may be wcmp_group: 95 95 94 94 94 94 95 95. In this example, for every 95 flows assigned to be distributed to a first and second egress port, 94 may be distributed to a third, fourth, fifth and sixth, and 95 may be distributed to the seventh and eight egress ports. Thus, the aggregate total of forwarding table entries to establish this ratio may be 95+95+94+94+94+94+95+95=756. According to aspects of the present technology, this load balancing ratio may be scaled down to reduce the number of forwarding entries used while additionally introducing limited throughput degradation.

In some circumstances, traffic flows may be load balanced among WCMP group members according to a set of weights to achieve 100% throughput. According to some aspects, to achieve improved network performance in case of uneven striping or failures in the network, more flows may be sent to some egress ports than others, thus weighting some ports more than others, resulting in WCMP flow distribution. For example, WCMP flow distribution is described in commonly owned, co-pending U.S. patent application Ser. No. 13/358, 835 filed Jan. 26, 2012 and entitled "MULTI-STAGE SWITCHING TOPOLOGY", the disclosure of which is incorporated by reference as if fully set forth herein.

Figure 1:
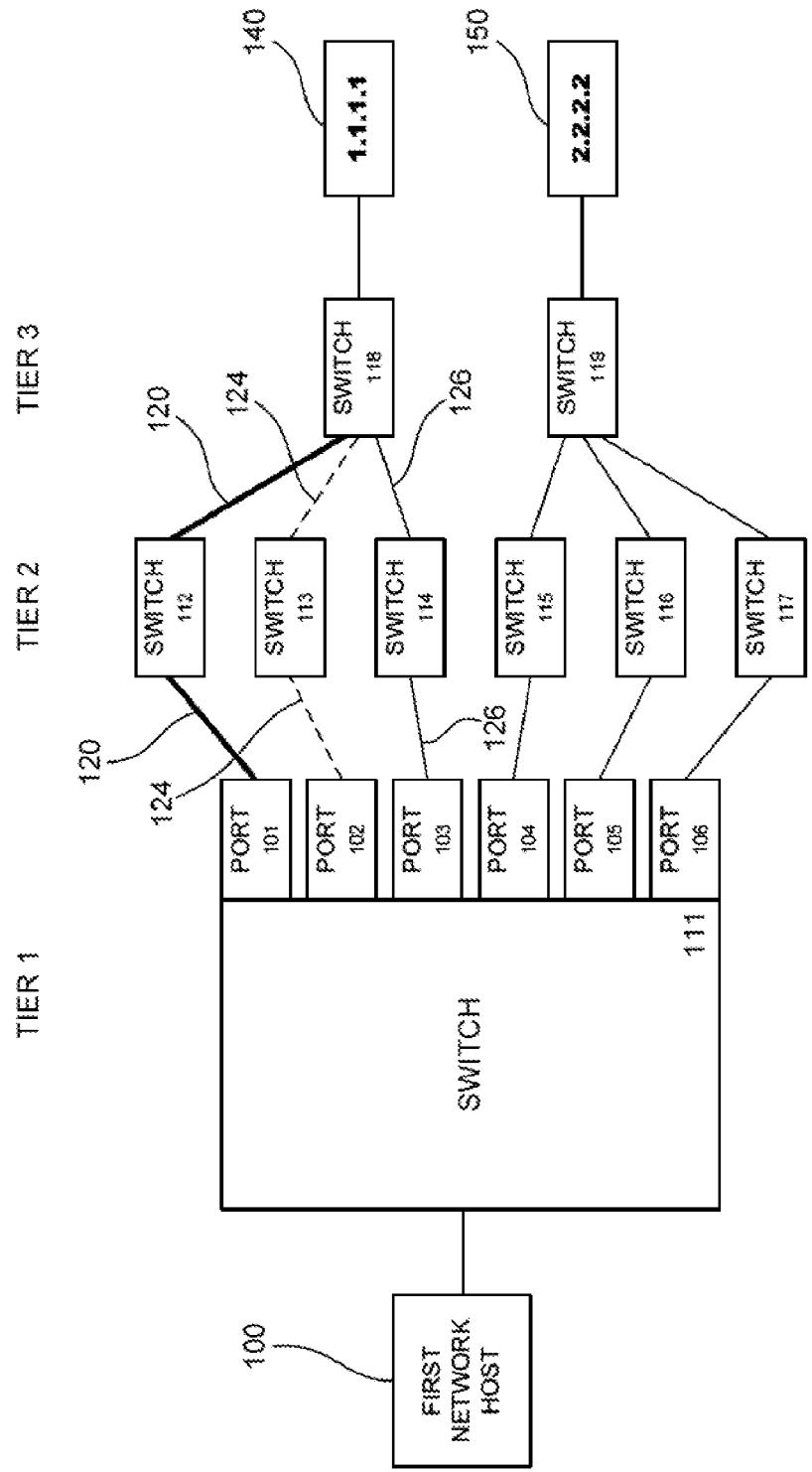
FIG. 1 is a schematic diagram of a multi-stage network according to aspects of the technology.

FIG. 1 is a schematic diagram of a multi-stage network 100 according to aspects of the technology. As shown, the network 100 comprises a first stage switch 111 (Tier 1) and a second stage (Tier 2) including a plurality of switches 112-117, and a third stage (Tier 3) including a second plurality of switches 118, 119. While only a few switches 111-119 are shown, it should be understood that network 100, may be expanded to include a number of switches to accommodate greater amounts of network traffic. For example, each of the Tier 3 switches 118, 119 may be coupled to one or more host devices 140, 150 such as network servers or other computing devices. Each Tier 2 switch 112-117 may further be coupled to one or more of the Tier 3 switches 118, 119.

Each switch 111-119 may include a predetermined number of data ports. The number of data ports may vary depending on, for example, a type of switch used and may be proportional to a cost of the switch. Some ports may be dedicated to downlink traffic (e.g., from Tier 2 switches to Tier 1 switches, or from Tier 1 switches to a first device 100), while others may be dedicated to uplink traffic (e.g., from Tier 1 switches to Tier 2 switches, or from Tier 2 switches to other network devices). Alternatively or additionally, some ports may be dedicated to ingress while others are dedicated to egress. The number of data ports may also dictate the number of links that may be established with other network devices. For example, Tier 1 switch 111 may have 16 data ports for uplink traffic, and thus 16 links may be established between the switch 111 and the Tier 2 switches 112-117.

In FIG. 1 switches 111-119 are illustrated as being connected to each other and thereby forming a portion of network 100. In this example, switch 111 has 6 egress ports having a number of paths to destination hosts at IP address 1.1.1.1 and 2.2.2.2. Each path may be composed of physical links having different bandwidth. For example, a first path 120 to server 1.1.1.1 may provide data transport speeds of up to 3 gigabits per second, a second path 124 to server 1.1.1.1 may provide data transport speeds of up to 2 gigabits per second and a third path 126 to server 1.1.1.1 may provide data transport speeds of up to 1 gigabit per second. Data originating from a first network device 100 may be, for example, designated to reach destination hosts 140, 150 by specifying IP address 1.1.1.1 or 2.2.2.2. Traffic destined to these addresses may be distributed among the paths in a weighted manner proportional to their respective capacities.

A forwarding table may be present at every switch 111-119 in the network 100. The forwarding table may store information about the IP destinations. Each table may contain a series of default entries according to the configuration of the switch, and additional entries can be added manually, for example by administrators that use TCP/IP tools, or automatically, when switches listen for routing information messages sent possibly by routers. It should be understood that switches 111-119 could be routers, bridges, or other types of devices capable of receiving packets at a first port and transmitting the packets through a second port.

Figure 2:
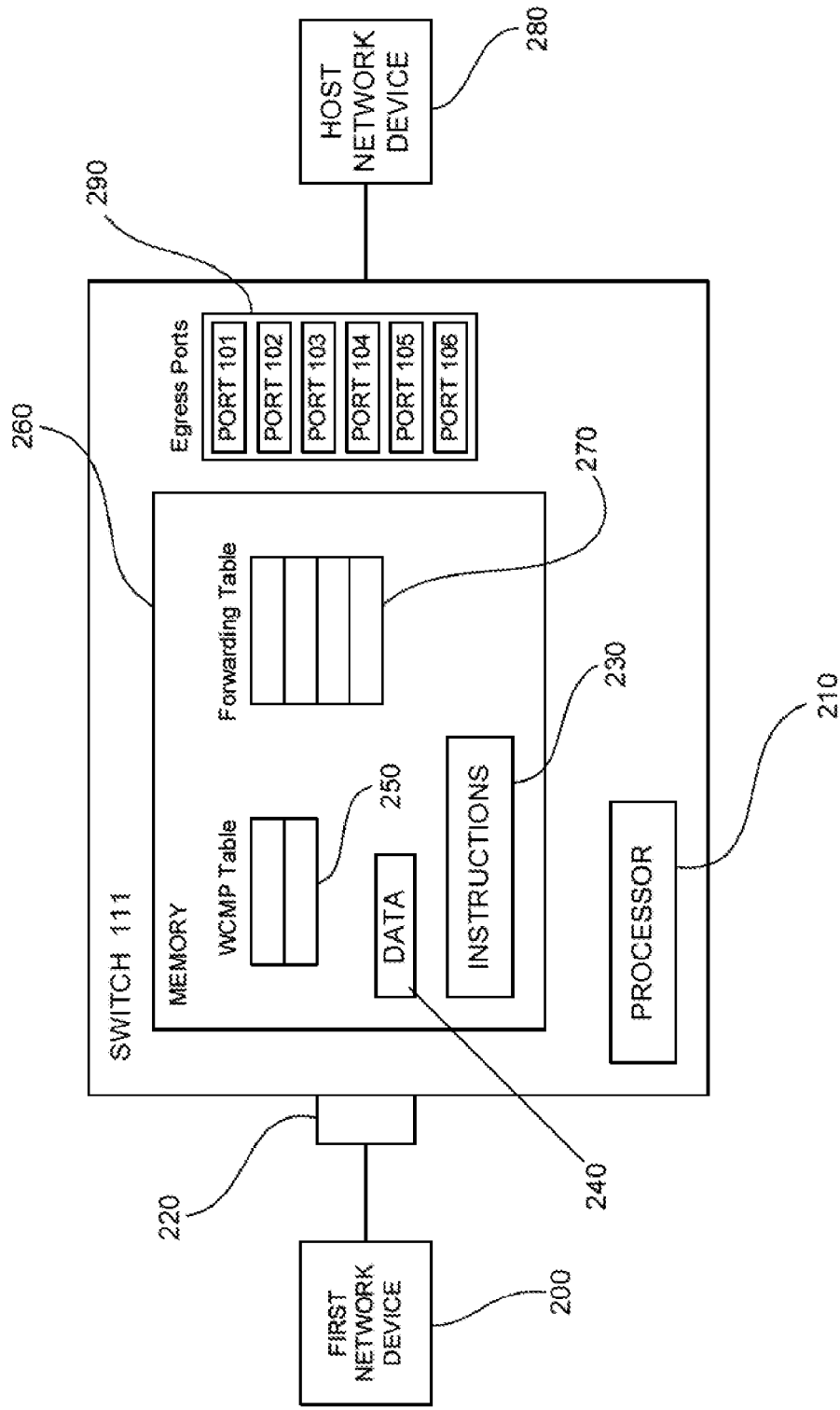
FIG. 2 is a block diagram that depicts a network switch according to aspects of the technology.

FIG. 2 is a block diagram that depicts a network switch 111 according to aspects of the technology. As shown, switch 111 comprises memory 260, including data 240 and instructions 230, and a processor 210 coupled to the memory 260. The switch may further comprise a number of potential egress ports 290 for data that entered the switch 111 through one or more ingress ports 220 from an originating first network device 200.

The memory 260 stores information accessible by processor 210, including the instructions 230 and data 240 that may be executed or otherwise used by the processor 210. The memory 260 may be of a type capable of storing information accessible by the processor 210, including a non-transitory computer-readable medium, or other tangible computer-readable mediums that store data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 230 may be a set of instructions to be executed directly (such as machine code) or indirectly (such as scripts) by the processor 210. For example, the instructions may be stored as computer code on the computer-readable medium. In that regard, the terms "instructions" and "programs" may be used interchangeably herein. The instructions may be stored in object code format for direct processing by the processor, or in other computer languages including scripts or collections of independent source code modules that are interpreted on demand or compiled in advance. Functions, methods and routines of the instructions are explained in more detail below.

The data 240 may be retrieved, stored or modified by processor 210 in accordance with the instructions 230. For instance, although the system and method is not limited by a particular data structure, the data may be stored in computer registers, in a relational database as a table having a plurality of different fields and records, XML documents or flat files. The data may also be formatted in a computer-readable format. The data 240 may comprise information sufficient to identify the relevant information, such as numbers, descriptive text, proprietary codes, references to data stored in other areas of the same memory or different memories (including other network locations) or information that is used by a function to calculate the relevant data.

The processor 210 may be a conventional processor, such as processors found in commercially available routers. Alternatively, the processor may be a dedicated controller such as an ASIC, FPGA or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The switch 111 may also include one or more tables such as forwarding table 270 and WCMP table 250. The switch 111 may further comprise a plurality of egress ports 290, which may be used to forward information to a next hop, such as a host network device 280. Although only one host device 280 is shown, the switch 111 may be coupled to a number of hosts 280 or other network devices. For example, the egress ports 290 may be linked to a different host device, or several egress ports 290 may be linked to a single device.

The forwarding table 270 may include a number of entries, each listing an egress port. As packets are received by switch 111, header information in those packets may be matched against keys of the forwarding table to determine a corresponding egress port (e.g., a next hop). The WCMP table 250 may, for example, include a weighting of each egress port 290 on switch 111, and may be used to determine which port (e.g., which egress data port) the packet should be transmitted through. While the forwarding table 270 and WCMP table 250 are shown as being stored together in the memory 260, it should be understood that the forwarding table 270, WCMP table 250, data 240, and instructions 230 may all be stored in separate non-transitory mediums of the switch 111.

Figure 3:
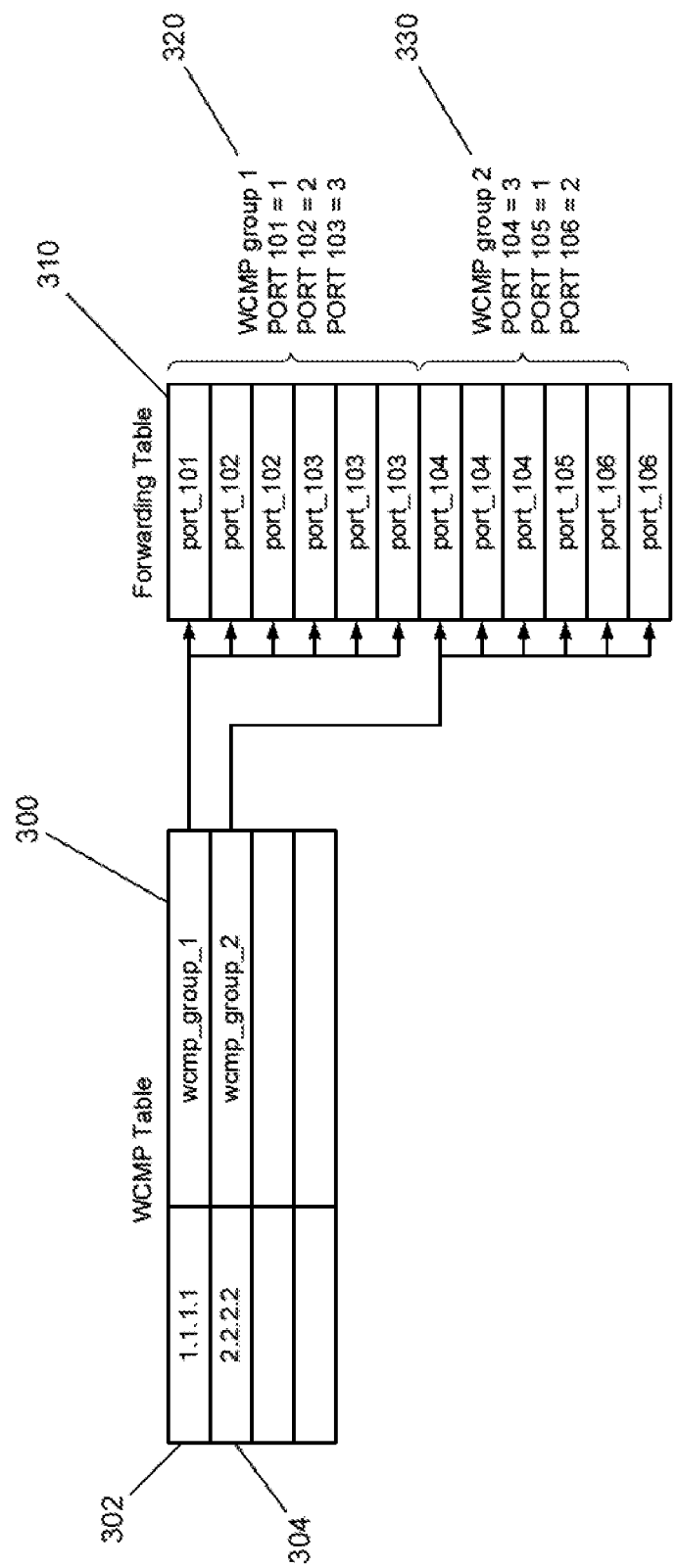
FIG. 3 is a diagram that illustrates a forwarding table and a WCMP table configured according to aspects of the technology.

FIG. 3 is a diagram that illustrates a forwarding table 310 and a WCMP table 300 configured according to aspects of the technology. Load balancing flows of data packets through a network device may be managed, for example, using forwarding tables 310 and WCMP tables 300. As shown, WCMP tables 300 may include a number of entries representing WCMP groups 302, 304. As discussed above, to implement a WCMP group, its member entries may be replicated in a forwarding table proportionally to their assigned weights.

Each entry of the WCMP table 300 may have a key and an action. The key may comprise a number of bits representing, for example, a destination address. The action may comprise information representing a group of egress ports for distributing packets over that match the key. The forwarding table 310 may include a plurality of entries 320, 330 with each entry identifying an egress port through which received packets may be forwarded. The number of entries listing a particular port may vary depending on a weight assigned to the port. For example, entry 302 in the WCMP table 300 identifies a destination address 1.1.1.1 of the destination host 102 (See FIG. 1). As shown in FIG. 1, the destination host 140 is coupled to the switch 111 through switches 112-114 and 118. Because the switches 112-114 are linked to ports 101-103, data addressed to the host device 140 may be distributed among those ports 101-103 in a weighted proportion.

Referring back to FIG. 3, port 101 may be assigned a weight of 1, port 102 may be assigned a weight of 2, and port 103 may be assigned a weight of 3, such weighting may be determined by an amount of bandwidth that can be handled by each physical connection between ports 101-103. As discussed, load balancing traffic flows may require the replication of forwarding table entries 320,330 with each storing an identification of a member port corresponding to a WCMP group. Accordingly, entry 302 may have a total of six entries 320 in the forwarding table 310. Similarly, entry 304 in WCMP table 300 may have a number of entries 330 in forwarding table 310 for distributing traffic.

In addition to the elements described above, system and methods according to aspects for the technology will now be described. While the systems and methods may include various stages, which are described below in a particular order, it should be understood that the sequence of the stages might be varied. In addition, stages may be omitted and/or additional stages may be added.

Figure 4:
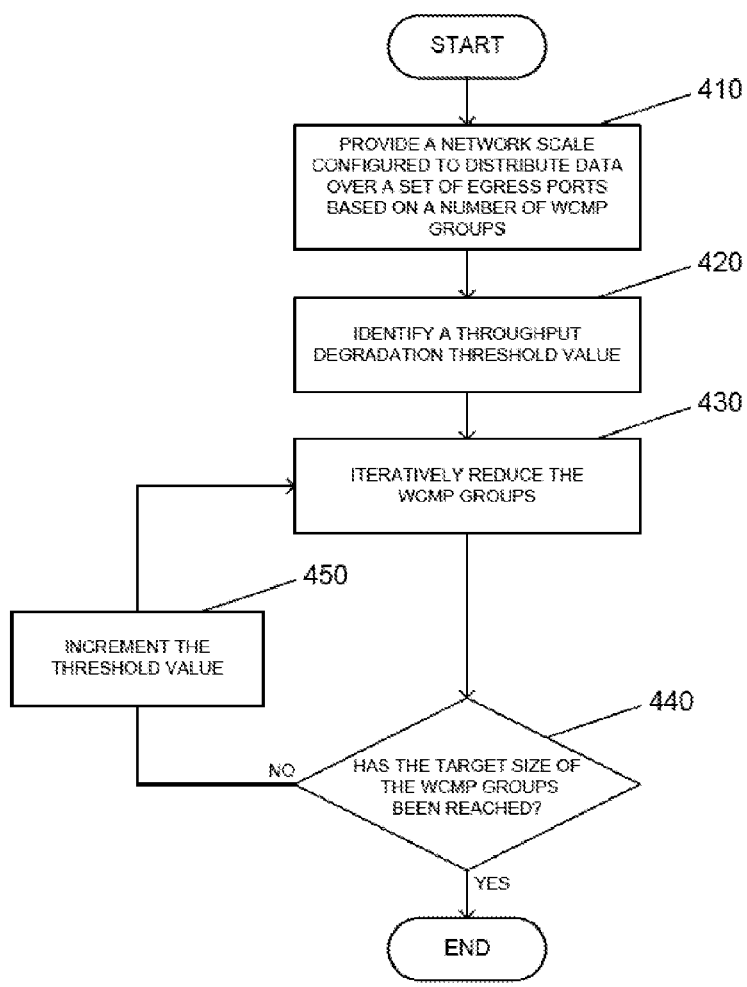
FIG. 4 illustrates a flow diagram of a method for scaling down the size of WCMP groups according to an aspect of the present technology.

FIG. 4 illustrates a flow diagram of a method 400 for scaling down the size of WCMP groups according to an aspect of the present technology. The method 400 is described with reference to a source/destination pair of host devices, such as the host devices 100, 140 and 150 (See FIG. 1). However, it should be understood that the operations discussed in connection with the method 400 may be applied to a pairing of network devices, including switches, backplanes, etc.

At stage 410, a network device is provided, such as switch 111 illustrated in FIG. 1. The network device may be configured to distribute data packets over a set of egress ports based on a weighted distribution. Multiple paths may exist between the network device and other destination hosts to which data packets are forwarded over time. In this regard, load balancing may be implemented on the device using WCMP groups in a manner that can minimize packet collisions.

At stage 420, a threshold value may be configured to indicate a maximum amount traffic throughput degradation allowed in a particular embodiment of method 400. For example, a maximum throughput degradation value may be 10%, and thus a minimum acquired throughput may be 90%. Network throughput may be measured by averaging a rate of successful messages delivered over a communication channel. For example, data passing over a physical or logical link, or passing through a certain network node can be measured in bits per second (bit/s or bps), and sometimes in data packets per second or data packets per time slot. Degradations in throughput performance can be due to uneven striping or failures in the network.

At stage 430, the aggregate size of the WCMP groups of the provided network device can be scaled down in a number of iterations. The weights assigned to members of the WCMP groups may be continually scaled until a calculated throughput degradation value reaches the threshold value configured in stage 420 or until an equal distribution of weights has been achieved. For example, an equal distribution of weights may be when each group member is assigned a weight of 1.

At stage 440, testing may be performed by method 400 to determine the aggregate size of the newly scaled down WCMP groups. For example, the aggregate size can be determined by calculating a sum of the member weights. This total may correspond to the number of forwarding table entries necessary to implement the WCMP groups. If the aggregate size of the WCMP groups is less than a predetermined target size of the forwarding table, the method 400 may proceed to stage 450. Otherwise, method 400 may stop.

At stage 450, the threshold value for throughput degradation may be increased to allow for even a further reduction of WCMP groups by a particular implementation of method 400. Based on the increase threshold value for throughput degradation, stage 450 may proceed back to stage 430 in order to further scale the WMCP groups until the new threshold value has be reached.

According to some embodiments, the method 400 may be described in a pseudo-code statement as follows:

wcmp_groups[i]: stores the iTH wcmp group.
wcmp_groups[i] [j]: stores the weight of jTH member in the iTH wcmp group and
T: target size of the forwarding table
Y: total number of WCMP groups
$\delta_{max}$: the maximum acceptable throughput degradation
υ: acceptable percentage increase in throughput degradation ScaleDownWcmpGroups(wcmp_groups, T)
{
  $\delta_{max}$=1.006;
  υ=0.001;
  While (TotalSize(wcmp_groups)>=T)
  {
    For i in [0..Y]
    {
      ShrinkWcmpGroup(wcmp_groups[i], new_wcmp_group, $\delta_{max}$;
    }
    wcmp_groups[i]=new_wcmp_group;
    // Stop scaling down remaining WCMP groups if the
    // aggregate size of WCMP groups goes below T
    If (TotalSize(wcmp_groups)<T) return;
    $\delta_{max}$+=υ;
  }
}

In the pseudo code above, $\delta_{max}$ represents the maximum acceptable throughput degradation allowed in an embodiment of method 400. As shown, $\delta_{max}$ may be set to 1.006 or approximately 0.6%. According to aspects of this disclosure, selected WCMP groups of a network device may be passed to a function ShrinkWcmpGroup, which is described in pseudo code below. ShrinkWcmpGroup takes the original WCMP group members, scales them, and returns a reduced set of WCMP group members that may be able to handle traffic flows comparably to the originally selected WMCP group within a 0.6% tolerance.

If an aggregate size Y of the scaled down WCMP groups is greater than a target size of the forwarding table T, method 400 continues to the next iteration, but may increase $\delta_{max}$ by a change value U. The change value U represents the amount of throughput degradation increase the system is willing to incur in order to further scale the WCMP groups, for example, in the pseudo code above, the change value may be set to 0.001 or a 0.1% increase in throughput degradation for each iteration. A call to function ShrinkWcmpGroup may repeat while a predetermined target size of forwarding table entries has not been reached by the aggregate size of the scaled WCMP groups.

Figure 5:
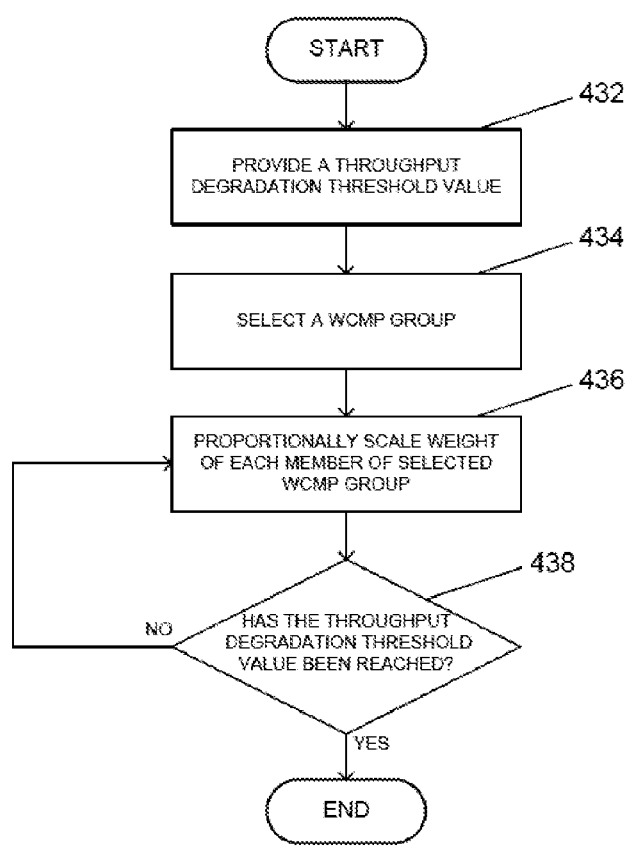
FIG. 5 illustrates a flow diagram of a method for scaling a WCMP group according to an aspect of the present technology.

FIG. 5 illustrates a flow diagram of a method for scaling down a WCMP group according to an aspect of the present technology. This flow diagram may be used, for example, to implement stage 430 of method 400. In some embodiments, the threshold value identified at stage 420 may be provided in stage 432. At stage 434, a WCMP group to scale may also be provided. The weight of each member of a selected WCMP group may be proportionally scaled at stage 436. For example, in a number of iterations, the size of each WCMP group member may be scaled as much as possible before the throughput degradation reaches the provided threshold value. At stage 438, while the throughput degradation of the scaled WCMP group is below the maximum threshold value allowed, the method may proceed again to stage 436 to further scale the member weights of the WCMP group.

In some embodiments, scaling member weights of a WCMP group may, for example, be represented by the following equation:

$$W_i(G')-=\text{floor}([W_0(G)-W_0(G')]*W_i(G)/W_0(G))$$

In the equation above, G represents the original WCMP group with k member ports, G' represents the newly scaled down WCMP group and floor represents a mathematical function which provides a greatest integer by discarding fractional results. According to some aspects, the throughput degradation of the iTH member of G (with weight $W_i(G)$ is proportional to $W_i(G)/W_i(G')$. Thus, to ensure uniform throughput degradation across the members in G, the reduction of the iTH member weight $(W_i(G)-W_i(G')$ is kept proportional to $W_i(G)$. It should be noted that in the above equation $W_0(G)$ may represent a member of group G that has the largest weight in the group. In one embodiment this member may be initially reduced by one.

The throughput degradation incurred by scaling down WCMP group G to G' may be represented by the following equation:

$$\Delta(G:G')=\max(\delta_k(G')/\delta_k(G)) \; 1\leq k \leq N$$

In this equation, $\delta_k(G)$ represents a maximum amount of traffic to be scheduled over member port k of the WCMP group G, $\delta_k(G')$ represents a maximum amount of traffic to be scheduled over member port k of the new scaled WCMP group G', and max represents a mathematical function that yields a largest number of a provided set of numbers. The maximum amount of traffic to be scheduled $\delta_k(G')$ and $\delta_k(G)$ may be calculated using the following equation:

$$\delta_k(G) = D * W_k(G) \bigg/ \sum_{i=1}^{N} W_i(G)$$

In this equation, D represents the maximum amount of traffic demand to be spread among N members of the provided WCMP group G, $W_i(G)$ represents the weight assigned to each member i of the WCMP group G, and $W_k(G)$ represents the weight assigned to each member k of the WCMP group G.

In one embodiment, the method for scaling down a WCMP group may be described in a pseudo-code statement as follows:

G: the original wcmp group with K member ports
G': the new scaled down wcmp group with throughput degradation no higher than $\delta_{max}$
$\delta_{max}$: the maximum acceptable throughput degradation ShrinkWCMPGroup(G, G' $\delta_{max}$)
{
  For i in [0..K]
    $W_i(G') = 1$;
  If $\Delta(G:G') <= \delta_{max}$
    return;
  G' = G;
  While $\Delta(G:G') <= \delta_{max}$
  {
    G'' = G'; // Cache the last known good wcmp group with
          // throughput degradation no higher than $\delta_{max}$
    For i in [0..K]

-continued

```
{
    If (i == 0)
        W₀(G)--; // Decrement the weight of member with
                 //     largest weight by 1
    Else
        Wᵢ(G') -= floor([W₀(G) - W₀(G')] * Wᵢ(G)/W₀(G))
                 // Scale the weight of other members
                 // proportionally
    }
    // Divide each member weight by LCD(G')
    // LCD(G'): is the largest common denominator
    //          of all member weights of G'
    For i in [0..K-1]
        Wᵢ(G') = Wᵢ(G')/LCD(G')
    }
    G' = G'';
}
```

In the pseudo-code statement above, while the throughput degradation Δ(G:G') is less than or equal to a provided threshold value (e.g., 0.6% oversubscription) the size of a selected WCMP group may continue to be scaled in the next iteration. In this embodiment, the largest common denominator of the member weights of a selected WCMP represented by function LCD(G') may be used to further scale member weights. If the threshold value has been reached in a particular iteration, then the WCMP group from the previous most recent iteration G'' will be returned.

Although the present technology has been described with reference to particular embodiments, it should be understood that these examples are merely illustrative of the principles and applications of the technology. For example, it should be understood that the described method may be implemented over a network, such as the Internet, or other types of private networks connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present invention as defined by the appended claims.

The invention claimed is:

1. A method for reducing a number of entries in a forwarding table of a first-stage distribution device, the device having a plurality of ports linked to a plurality of second stage devices, the method comprising:
   identifying one or more weighted cost multipath (WCMP) groups, each WCMP group comprising weights assigned to a corresponding set of the plurality of ports of the first-stage device for a distribution of data to the plurality of second-stage devices, wherein each WCMP group defines a weighted distribution for forwarding packets associated with a common flow across the corresponding set of the plurality of ports according to weights assigned to the respective ports, and wherein a weight assigned to at least one of the corresponding set of the plurality of ports is different from the weights assigned to at least one other port of the corresponding set of the plurality of ports;
   determining, using a processor, a percentage of data throughput corresponding to the assigned weights;
   determining a threshold value for throughput degradation of the first-stage distribution device; and
   for each WCMP group, iteratively scaling the weights assigned to the plurality of ports down, using the processor, by decrementing the weight assigned to a selected port by a first amount and decrementing the weights assigned to non-selected ports in relative proportion to the first amount, until the occurrence of a predetermined event.

2. The method of claim 1, wherein the predetermined event comprises one of:
   reaching the threshold value for throughput degradation and reaching an equal distribution of weights for the WCMP group.

3. The method of claim 1, wherein the predetermined event comprises reaching a target number of entries in the forwarding table.

4. The method of claim 1, wherein iteratively scaling down further comprises:
   decrementing a port weight having a largest original value by 1;
   decrementing other port weights proportionally; and
   dividing each port weight by a largest common denominator of all port weights.

5. The method of claim 4, further comprising incrementing the threshold value associated with the first-stage distribution device.

6. The method of claim 1, further comprising storing the weights assigned to the plurality of ports of the first stage device in a configurable forwarding table.

7. The method of claim 1, wherein the forwarding table of the first stage device dictates the distribution of traffic.

8. The method of claim 1, wherein iteratively scaling down further comprises decrementing the weights assigned to the non-selected ports using the following equation:

$$W_i(G')\mathrel{-}=\mathrm{floor}([W_0(G)-W_0(G')]*W_i(G)/W_0(G)),$$

where W is a weight assigned the iTH member of a given WCMP group, G is the original WCMP group, and G' is the skinny WCMP group with a throughput degradation below the threshold value.

9. The method of claim 1, wherein the predetermined event comprises:
   determining whether an aggregate size of the WCMP group meets a size of the forwarding table entries;
   when the aggregate size of the WCMP group meets the size of the forwarding table entries, increasing the threshold value for throughput degradation; and
   continuing iteratively scaling down weights of the WCMP group until the increased threshold value for throughput degradation is satisfied.

10. A system for reducing a number of entries in a forwarding table of a first-stage distribution device, the device having a plurality of ports linked to a plurality of second stage devices, the system comprising:
   a processor; and
   a memory accessible by the processor, the memory storing instructions executable by the processor, the instructions comprising:
      identifying one or more weighted cost multipath (WCMP) groups, each WCMP group comprising weights assigned to a corresponding set of the plurality of ports of the first-stage device for a distribution of data to the plurality of second-stage devices, wherein each WCMP group defines a weighted distribution for packets associated with a common flow across the corresponding set of the plurality of ports according to weights assigned to the respective ports, and wherein a weight assigned to at least one of the corresponding set of the plurality of ports is different from the weights assigned to at least one other port of the corresponding set of the plurality of ports;

determining a percentage of data-throughput corresponding to the assigned weights;

determining a threshold value for throughput degradation of the first-stage distribution device; and for each WCMP group, iteratively scaling the weights assigned to the plurality of ports down by decrementing the weight assigned to a selected port by a first amount and decrementing the weights assigned to non-selected ports in relative proportion to the first amount, until the occurrence of a predetermined event.

11. The system of claim 10, wherein the predetermined event comprises one of:

reaching the threshold value for throughput degradation and reaching an equal distribution of weights for the WCMP group.

12. The system of claim 10, wherein the predetermined event comprises reaching a target number of entries in the forwarding table.

13. The system of claim 10, wherein iteratively scaling further comprises:

decrementing a port weight having a largest original value by 1;

decrementing other port weights proportionally; and dividing each member weight by a largest common denominator of all port weights.

14. The system of claim 13, further comprising incrementing the threshold value associated with the first-stage distribution device.

15. The system of claim 10, further comprising storing the weights assigned to the plurality of ports of the first stage device in a configurable forwarding table.

16. The system of claim 10, wherein the forwarding table of the first stage device dictates the distribution of traffic.

17. The system of claim 10, wherein scaling further comprises decrementing weights assigned to non-selected ports using the following equation:

$$W_i(G')\mathrel{-}=\mathrm{floor}([W_0(G)-W_0(G')]*W_i(G)/W_0(G)),$$

where W is a weight assigned the iTH member of a given WCMP group, G is the original WCMP group, and G' is the skinny WCMP group with a throughput degradation below the threshold value.

18. A method for scaling WCMP groups comprising:

providing a WCMP group, the WCMP group comprising weights assigned to a plurality of ports of a first-stage device, wherein each WCMP group defines a weighted distribution for forwarding packets associated with a common flow across the plurality of ports according to weights assigned to the respective ports, and wherein a weight assigned to at least one of the plurality of ports is different from the weights assigned to at least one other port of the plurality of ports;

providing a threshold value for throughput degradation of the first-stage distribution device; and iteratively scaling the weights assigned to the plurality of ports down, using a processor, by decrementing the weight assigned to a selected port by a first amount and decrementing the weights assigned to non-selected ports in relative proportion to the first amount while the threshold value for throughput degradation has not been reached.

19. The method of claim 18, wherein iteratively scaling down further comprises dividing the weight assigned to each port of the WCMP group by a largest common denominator of the assigned weights.

20. A system for scaling WCMP groups comprising:

a processor; and a memory accessible by the processor, the memory storing instructions executable by the processor, the instructions comprising:

providing a WCMP group, the WCMP group comprising weights assigned to a plurality of ports of a first-stage device, wherein each WCMP group defines a weighted distribution for forwarding packets associated with a common flow across the plurality of ports according to weights assigned to the respective ports, and wherein a weight assigned to at least one of the plurality of ports is different from the weights assigned to at least one other port of the plurality of ports;

providing a threshold value for throughput degradation of the first-stage distribution device; and iteratively scaling the weights assigned to the plurality of ports down by decrementing the weight assigned to a selected port by a first amount and decrementing the weights assigned to non-selected ports in relative proportion to the first amount while the threshold value for throughput degradation has not been reached.

21. The system of claim 20, wherein iteratively scaling down further comprises dividing the weight assigned to port of the WCMP group by a largest common denominator of the assigned weights.

* * * * *